Aug. 28, 1934.　　　J. JUNGFERMAN　　　1,971,719
AUTOMATIC POULTRY FOUNTAIN
Filed Aug. 16, 1933　　3 Sheets-Sheet 1

Fig. 1.

Inventor
J. Jungferman

By Clarence A. O'Brien
Attorney

Aug. 28, 1934.  J. JUNGFERMAN  1,971,719
AUTOMATIC POULTRY FOUNTAIN
Filed Aug. 16, 1933  3 Sheets-Sheet 2
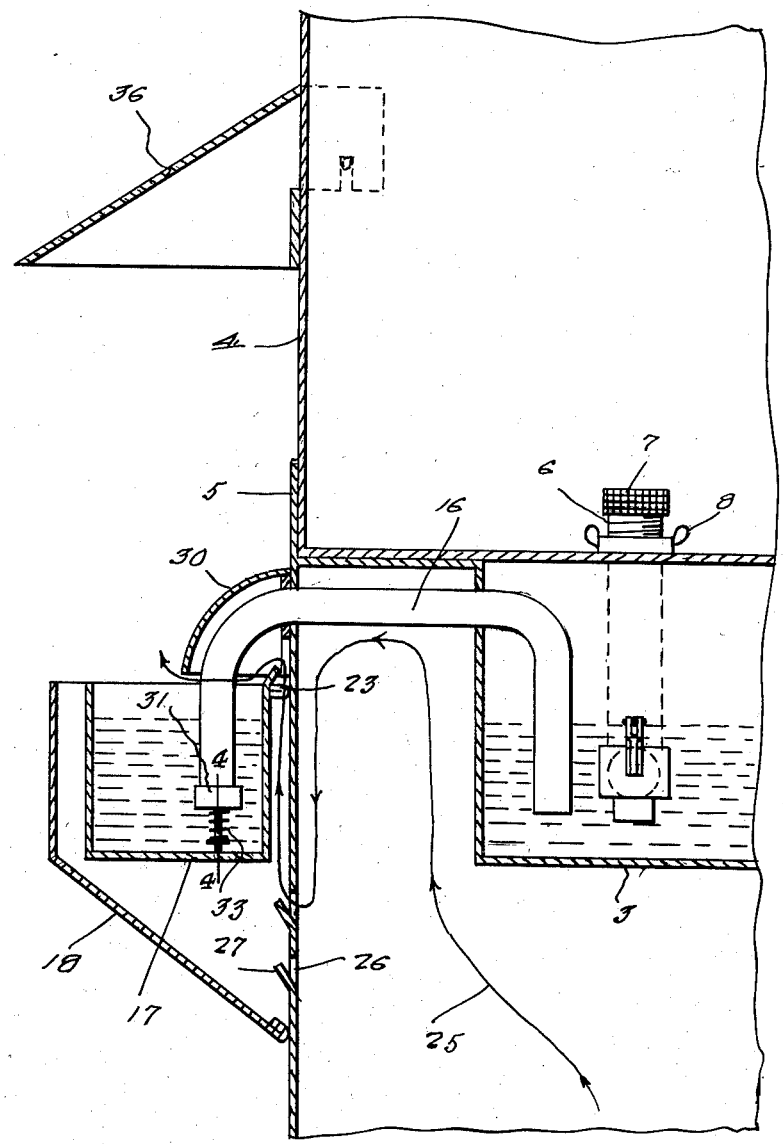
Inventor
J. Jungferman
By Clarence A. O'Brien
Attorney Aug. 28, 1934.   J. JUNGFERMAN   1,971,719
AUTOMATIC POULTRY FOUNTAIN
Filed Aug. 16, 1933   3 Sheets-Sheet 3

Inventor
J. Jungferman
By Clarence A. O'Brien
Attorney

Patented Aug. 28, 1934

1,971,719

UNITED STATES PATENT OFFICE 1,971,719

AUTOMATIC POULTRY FOUNTAIN

Joseph Jungferman, Ulysses, Kans.

Application August 16, 1933, Serial No. 685,453

2 Claims. (Cl. 119—73)

This invention relates to an automatic poultry fountain, the general object of the invention being to provide a tank for receiving the water, a float controlled valve for keeping the water at a certain level therein, a number of troughs and siphon means for conveying the water from the tank to the troughs.

Another object of the invention is to provide means whereby the troughs can be easily and quickly removed for cleaning purposes, with automatic valves for closing the siphon means when the troughs are removed and for opening the siphon means when the troughs are replaced.

A further object of the invention is to provide means for heating the parts to prevent the water from freezing in cold weather.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of the invention.

Figure 2 is a vertical sectional view through a portion thereof.

Figures 3, 4:
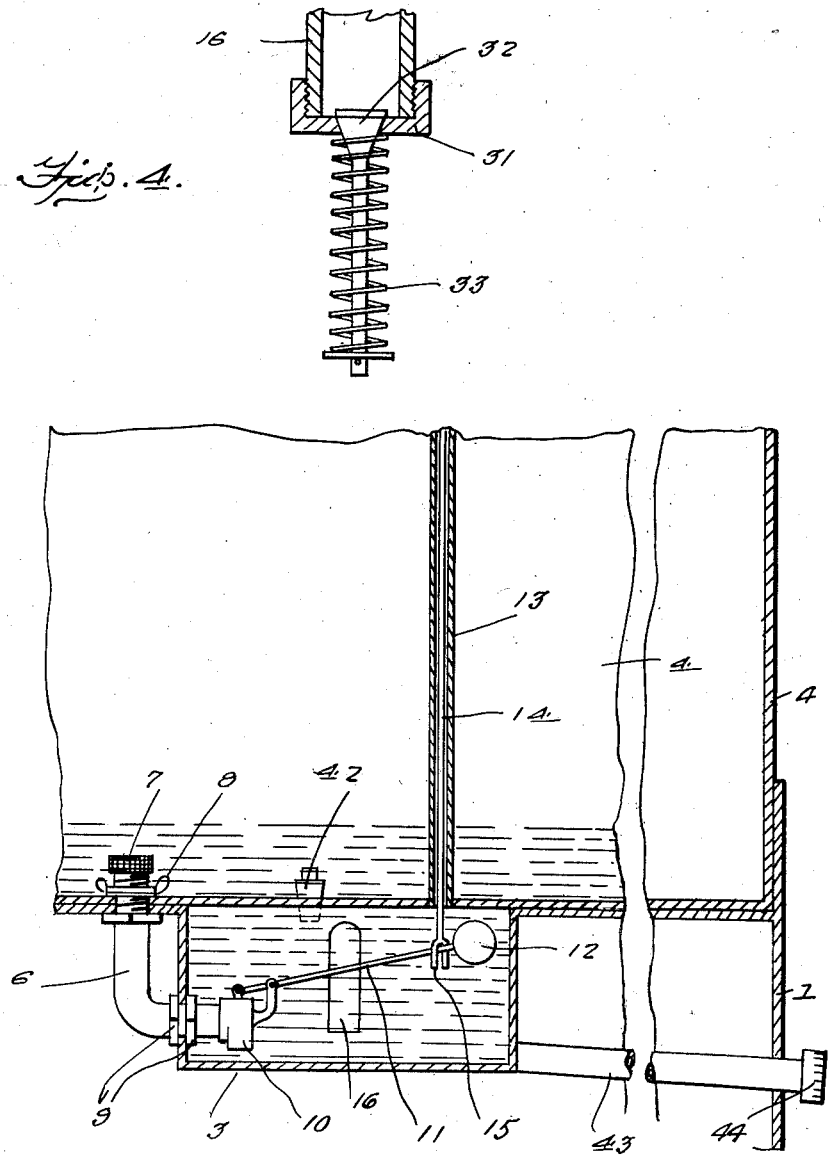
Figure 3 is a vertical sectional view showing a portion of the main tank and the float tank the section being taken on line 3—3 of Figure 1.
Figure 4 is a sectional view showing the siphon valve the section being taken on line 4—4 of Figure 2.

In these drawings, the numeral 1 indicates a vertically arranged housing supported on the base 2 and supporting a float tank 3 in its upper part which is spaced from the sides of the housing, and the numeral 4 indicates the large supply tank supported on the housing with its bottom covering the tank 3. As shown in Figure 2, the tank 4 has its bottom resting on the top portion of the housing 1, with the upper portions of the housing extended to form flanges 5 for holding the tank 4 in position. An elbow pipe 6 extends through a hole in the bottom of the tank 4 into the lower part of the tank where the pipe is provided with a screen 7 and the wing nut 8 threaded on a part of the pipe 6 holds the pipe in place. Another part of the pipe 6 extends into the tank 3 and is held in place by the nuts 9 and a valve 10 is located on the inner end of this pipe 6 and is controlled by the float carrying rod 11, the float of which is shown at 12. Thus this float will regulate the amount of water flowing from the tank 4 into the tank 3.

A vertically arranged tube 13 extends from the top of the tank 4 through the bottom thereof, and a rod 14 passes through the tube and has a forked lower end 15 which straddles the rod 11 so that by depressing the rod 14, the float can be lowered to permit the tank 3 to be entirely filled with water from the tank 4 so as to start the siphons, each of which consists of an inverted U-shaped tube 16 leading from the tank 3 through the space between the tank and the sides of the housing and into the troughs 17. Each trough is carried by a small housing 18 preferably of the shape shown in Figures 1 and 2 and having inwardly extending side parts 19 which overlap opposite sides of the housing and have notches 20 therein for receiving the pins 21 projecting from said sides of the housing. Each housing 18 is provided with the handles 22 and the trough 17 has its bottom and front and rear sides spaced from the housing 18 and the adjacent side of the housing 1, as shown in Figure 2. A flange 23 is formed at the inner side of the trough or that side adjacent the side of the housing 1 and tends to space the trough from said side of the housing 1, though the flange is interrupted so that spaces are formed for the passage of the heated air from a lamp 24 placed in the lower part of the housing 1, as shown by the arrow line 25 in Figure 2. The housing 1 is formed with the openings 26, the metal of the housing being cut and bent outwardly, as at 27, to provide these openings and these tongues or bent portions 27 act to deflect the heated air upwardly, as shown.

An opening covered by a door 28 is formed in a side of the housing 1 for providing access to the lamp and this door has a screen covered opening 29 therein for admitting air to the lamp.

An arcuate hood 30 covers the curved part of each siphon tube 16 and is detachably connected to the housing 1 and these hoods deflect the heated air downwardly toward the water in the troughs, as shown by the arrow line in Figure 2.

A cap 31 is threaded to the outer end of each siphon tube and has an opening therein which forms a valve seat for a valve 32 which is normally held in closed position by a spring 33 on the stem of the valve. This stem is of such a length that when the trough is in position, the bottom of the trough pressing against the stem will hold the valve open, but as soon as the trough with its housing 18 is removed, the spring 33 will close the valve so that no water will escape from the siphon.

Perches 34 are supported from the housing 1 by the brackets 35 so that fowls can rest on these perches to drink water from the trough and a hood 36 is arranged above each trough and is detachably connected to the tank 4, as shown generally at 37. The tank 4 is provided with the handles 38 and a ridged cover 39, the handle 40 of which is so formed as to prevent the poultry from roosting thereon.

The upper end of the rod 14 extends through a hole in the cover 39 and has a head or knob on its upper end which is engaged by a spring 41 which holds the rod in its upper position so that its forked lower end will not interfere with the operation of the float rod. However, when it is desired to start the siphons, this rod is pushed downwardly so as to hold the valve open against the action of the float and thus permit the tank 3 to be filled to a level above the siphons 16 so as to start the siphoning action. After the action is started, the rod is released and the spring 41 will return it to raised position.

A drain hole is formed in the bottom of the tank 4 for communicating the tank 4 with the tank 3 and this hole is closed by a plug 42 and the tank 3 is provided with a drain pipe 43 closed by a cap 44.

As will be seen, by lifting the tank 4 off the housing 1, access to the tank 3 is provided, though before this can be done, the winged nut 8 and the screen 7 must be removed from the pipe 6.

It will, of course, be understood that the pipe 6 can be attached to a pipe leading to a pressure supply and in this case the tank 4 is not necessary, though it may be placed in position to form a top for the device.

From the foregoing, it will be seen that the troughs from which the fowls drink are entirely separated from the main source of supply so that this main source will not be contaminated by dirt or the like getting into the water in the troughs and the troughs can be easily and quickly removed for cleaning puposes and when so removed, the valves 32 automatically close and prevent the escape of water from the main tank. The heated air from the lamp will keep the water in all the parts from freezing.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. A fountain of the class described comprising a housing, a supply tank located therein, float operated means for supplying water to the tank, a trough located exteriorly of the housing and having its top at a lower level than the top of the tank, a siphon tube leading from the tank into the trough, a small housing supporting the trough and providing a space between itself and the trough, means for detachably connecting the small housing to the main housing, a spring pressed valve at the lower end of the siphon tube for closing the same when the trough is removed, said valve being opened when the trough is in place, said main housing having openings therein in communication with the small housing, a lamp in the main housing for providing heated air to heat the tank and the siphon tube, said heated air passing through the opening into the space between the trough and its housing to heat the trough, said trough being slightly spaced from the main housing to permit some of the air to pass between the trough and the main housing, and a detachable hood supported from the main housing and covering that part of the siphon tube leading from the main housing into the trough, said hood directing some of the heated air downwardly into the trough.

2. A fountain of the class described comprising a vertically arranged housing, a tank located in the same, troughs detachably connected to exterior portions of the housing, siphon tubes leading from the tank into the troughs, means for automatically closing the siphon tubes when the troughs are removed, but opening the siphon tubes when the troughs are in place, a large tank detachably supported by the housing, a tube leading from the large tank into the first mentioned tank, a float operated valve for controlling the flow of water from the tube to the first mentioned tank, means extending through the large tank for holding the float in lowered position with the valve open to start the siphons, hoods carried by the large tank and extending over the troughs, perches supported by the housing and arranged adjacent the troughs, and heating means in the housing for heating the water in the various parts.

JOSEPH JUNGFERMAN.